United States Patent [19]

Maxfield et al.

[11] Patent Number: 4,915,985
[45] Date of Patent: Apr. 10, 1990

[54] PROCESS FOR FORMING ARTICLES OF FILLED INTRINSICALLY CONDUCTIVE POLYMERS

[75] Inventors: MacRae Maxfield, Plainfield; Lawrence W. Shacklette; Sharon Gould, both of Maplewood, all of N.J.

[73] Assignee: Allied-Signal Inc., Morris Township, Morris County, N.J.

[21] Appl. No.: 895,596

[22] Filed: Aug. 15, 1986

Related U.S. Application Data

[63] Continuation of Ser. No. 762,357, Aug. 5, 1985, abandoned.

[51] Int. Cl.$^4$ .............................. B05D 5/12
[52] U.S. Cl. .................. 427/126.6; 204/14.1; 264/104; 427/55; 427/126.3; 427/214; 427/216; 427/221; 427/255.5; 427/255.6; 427/302; 427/318; 427/327; 427/409; 427/419.2; 427/419.5; 427/435
[58] Field of Search .................. 204/14.1; 264/104; 427/55, 126.3, 126.6, 214, 216, 221, 255.5, 255.6, 302, 318, 327, 409, 419.2, 419.5, 435

[56] References Cited

U.S. PATENT DOCUMENTS

| | | | |
|---|---|---|---|
| 3,325,304 | 6/1967 | Hauck | 427/333 |
| 4,321,114 | 3/1982 | MacDiarmid et al. | 204/2.1 |
| 4,375,427 | 3/1983 | Miller et al. | 252/512 |
| 4,528,254 | 7/1985 | Wolf et al. | 429/197 |
| 4,631,205 | 12/1986 | Eveleigh | 427/255.6 |

FOREIGN PATENT DOCUMENTS 108408  8/1980  Japan .................................. 429/213

OTHER PUBLICATIONS

Electrochemical Society Proceedings, ... "The Role of Conductive Polymers in Alkali-Metal Secondary Electrodes"—T. R. Jow et al.
Electrochemical Society Proceedings, ... "Conducting Polymer—Li Alloy Composite Electrodes"—M. Maxfield et al.

*Primary Examiner*—Bernard Pianalto
*Attorney, Agent, or Firm*—Richard C. Stewart; Gerhard H. Fuchs

[57] ABSTRACT

A method of fabricating an electrode which comprises an intimate mixture of finely divided electroactive material in a matrix composed of a conjugated backbone polymer which comprises the steps of: derivatizing the surface of finely divided alkali-metal alloying metal, alkali metal cation inserting material or anion inserting material with active polymer catalyst; dispersing the derivatized metal or material having a desired small particle size in a gas, suspension or solution of a monomer or other precursor of the desired conjugated backbone polymer and polymerizing the monomer and/or precursor in the presence of the dispersed metal or material; and fabricating a cohesive solid by recovering the polymerization product from said gas, suspension or solution comprising derivatized metal or material coated with conjugated backbone polymer and forming same into a cohesive solid.

22 Claims, No Drawings

4,915,985

PROCESS FOR FORMING ARTICLES OF FILLED INTRINSICALLY CONDUCTIVE POLYMERS

This application is a continuation of application Ser. No. 762,375, filed 8/5/85, now abandoned.

BACKGROUND OF THE INVENTION

(1) Field of the Invention

This invention relates to a process for adding filler materials to a conjugated polymer matrix. More particularly, this invention relates to such a process in which the integrity and cohesiveness of the resulting composite is retained throughout extreme and/or repetitive shape changes of the filler and/or polymer.

(2) Prior Art

Conjugated backbone polymers, e.g., polyacetylene, polyphenylene, polyacenes, polythiophene, poly(phenylene vinylene), polyazulene, poly(phenylene sulfide), polyphenyleneazomethine poly(phenylene oxide), polythianthrene, poly(N-methylcarbazole) poly(phenylquinoline), polyaniline, and polypyrrole, have been suggested for use in a variety of applications based upon their characteristic of becoming conductive when oxidized or reduced either chemically or electrochemically. The secondary battery application described by, e.g. MacDiarmid et al. in U.S. Pat. No. 4,321,114, (1981); *J. de Physique*, Colloque C3, Vol. 44 (1983), articles beginning on page 579, page 615 and page 537; and K. Kaneto et al., *Japanese J. of Applied Physics*, Vol. 22, pp. L567-L568 (September 1983) and pp. L412-L414 (July 1983), employs one or more electrodes having conjugated backbone polymers as the electroactive material. Such electrodes can, for example, be reversibly complexed with alkali metal or tetraalkylammonium cations during battery cycling, most commonly with insertion of cations into a polymer anode (the negative battery electrode) occurring during charging. The more such cations are inserted, the more conductive the electrode becomes and the more cathodic the potential of the anode becomes.

U.S. Pat. No. 4,002,492 discloses electrochemical cells having an anode consisting essentially of lithium aluminum alloys that contain lithium in amounts between about 63% and 92% and the balance essentially aluminum. Anodes composed of lithium and aluminum are also disclosed in Rao, et al., *J. Electrochem. Soc.* 124, 1490 (1977), and Besenhard, *J. Electroanal. Chem.*, 94, 77 (1978).

European Patent No. 0070107 A1; Murphy et al., *J. Electrochem. Soc.*, 126, 349 (1979) and Murphy et al., *Mat. Res. Bull.*, 13, 1395 (1978) disclose batteries based on lithium intercalation in layered transition metal dichalcogenides.

Composite structures of a conjugated backbone polymer and a non-electroactive material have been described in U.S. Pat. No. 4,394,304 and in the above *J. de Physique* issue, articles beginning on page 137 and on page 151. Representative other components that have been blended with polyacetylene or onto which polyacetylene or polypyrrole has been deposited include polyethylene, polystyrene, graphite, carbon black, NESA glass and silicon. In selected instances, such composite structures have been suggested for use in batteries, (see Showa Denko K.K, European Published Patent Application 76,119 (1982)).

SUMMARY OF THE INVENTION

In accordance with this invention there is provided a process for fabricating a composite comprising a substrate and a polymer selected from the group consisting of a conjugated backbone polymer or a polymer which can be converted into a conjugated backbone polymer, which polymer adheres to the surface of said substrate. The process comprising contacting monomers or other precursors of the polymer with a substrate whose surface possesses catalytic activity for the polymerization of said monomers or precursors thereby forming a conjugated backbone polymer or a polymer which can be converted into a conjugated backbone polymer on the surface of the substrate. In the embodiments of this invention in which the substrate material is not itself catalytic for the polymerization of monomers or precursors of the polymer, the process comprises the steps of:

(a) derivatizing the surface of said substrate with an active polymerization catalyst; and (b) contacting said derivatized substrate with said monomers or other presursors of said polymer and polymerizing said monomers or precursores in the presence of said derivatized substrate thereby forming said polymer on the derivatized surface of said substrate. In the embodiments of the invention in which the polymer substrate composite forms an article having a continuous polymer phase, the process includes an additional step (c) in which the polymer-coated substrate is combined with additional polymer, either by blending or by further polymerization of monomers or precursors in the presence of the polymer-coated substrate. In those embodiments of the invention in which the polymer is of the type which can be converted into a conjugated backbone polymer, the process includes an additional step (d), in which the conversion is carried out through use of some suitable conversion means such as thermal, chemical, electrochemical or photochemical treatment.

The process of this invention provides superior adhesion between the substrate and the polymer, thereby providing for enhanced electrical contact between the substrate and the conjugated backbone polymers in the doped form, and improved mechanical stability of the polymer/substrate composite.

DESCRIPTION OF THE PREFERRED EMBODIMENTS

The shape and size of the substrate is not critical and can vary widely. The substrate can be in the form of powders, flakes, sheets, fibers, ribbons and the like. The substrate can be composed of any material provided that the substrate includes a surface layer which is suitable for anchoring a polymerization catalyst; or a surface layer which is capable of bonding tightly to a coating which is suitable for anchoring a polymerization catalyst; or a surface layer which is active as a polymerization catalyst. For example, such substrate can be metals or highly conducting materials such as alumimun, titanium, nickel, steel, stainless steel, graphite and like fillers where the resulting, filled polymer is used for EMI shielding purposes. The substrate can be a semiconductor material such as silicon, selenium, germanium, gallium arsenide, cadium sulfide, and the like where the polymer coating is used to protect the semiconductor when it is used in photoelectric and photoelectrochemical cells. The substrate can also be a material which is subject to corrosion, in which event, the process is used to apply the polymer as a corrosion preventing or resistant coating. In addition, the substrate can consist of a metal grid such as a steel, stainless steel or nickel grid when the polymer coated substrate is intended for use as a current collector in a battery. Similarly, the substrate can consist of finely divided filler material, when the polymer coated substrate is intended for use as a precursor material in the manufacture of electrodes for secondary batteries. Illustrative of materials useful in the manufacture of battery anodes are alkali metal alloying materials, as for example, antimony, silicon, magnesium, lead, tin, aluminum, bismuth, Al-Si alloys, Al-Mg alloys, Al-Si-Sn alloys, Bi-Pb-Sn-Cd alloys, Li-Al alloys, or tin/lead alloys; transition metal chalcogenides capable of inserting alkali metal cations at an electrochemical potential of less than about 1.5V with respect to that of the Li/Li+ couple such as $Li_xTiS_2$ ($1 \leq x \leq 2$, ), $MoO_2$, $WO_2$ and $Li_xVS_2$ ($1 \leq x \leq 2$); and the like. Illustrative of materials useful in the manufacture of battery cathodes are materials which are capable of inserting cations or anions at an electrochemical potential greater than about 1.5V versus Li/Li+, as for example, transition metal chalcogenides such as $CoO_2$, $TiS_2$, $MoS_2$, $V_6O_{13}$, $NiPS_2$, $MoO_3$, $Cr_{1-x}V_xS_2$, $Cr_3O_8$ $V_2O_5$ and graphite; the alkali-metal inserted forms of such metal chalcogenides such as $Li_xCoO_2$, $Na_xCoO_2$, and $Li_xV_6O_{13}$; and the like. The type of substrates mentioned above are for illustrative purposes only and should not be construed as exhaustive of types of useful substrates.

For substrates having a surface suitable for anchoring polymerization catalysts, the first step of the process is the derivatization of the substrate surface by a component of a catalyst system that is active in polymerization reactions forming conjugated backbone polymers or polymers which can be converted to conjugated backbone polymers. The derivatization is performed by contacting a catalyst component with a substrate whose surface contains reactive functionalities such as oxides, hydroxides, sulfides, hydrogen sulfides and the like. For example, when the substrate consists of a metal, often the surface of the metal possess an oxide hydroxide layer which may react with a suitable catalyst component such as $AlCl_3$, $Ti(O-nBu)_4$, $MoOCl_4$, $MoCl_5$ or $WCl_6$, to yield a metal substrate bonded at the surface via its oxide layer to a modified catalyst component according to the equation:

where, A represents for example a transition metal and X represents for example a halide or an alkoxide. Prior to contacting the derivatized substrate with monomers, the remaining catalyst components are added as neccessary to the derivatized substrate to make a complete catalyst bonded to the substrate.

For those substrates that do not possess a surface layer which reacts with suitable catalyst components and that are not polymerization catalysts themselves, the process requires a pretreatment of the substrate, as for example pretreatment with nitric acid, chromic acid and sodium hydroxide, to introduce surface functional groups such oxides, hydroxides, sulfides, carboxylic acids and the like. Derivatization of the treated surface can then proceed as above.

For the substrate whose surface is catalytic for polymerization, derivatization is not required and the substrate and the monomers or precursors are merely contacted in a suitable medium. For example, $Na_xCoO_2$, $Li_xCoO_2$, $V_2O_5$, or other high potential transition metal chalcogenides can be contacted with a solution of reactive monomers such as pyrrole or thiophene in the presence of an electrolyte salt to form oxidized polypyrrole or polythiophene on the substrate surface.

In the preferred embodiments of the invention in which the process is used to prepare an anode containing a finely divided electroactive material dispersed in a conjugated backbone polymeric matrix, the substrate is a finely divided metal, alloy or other electroactive material. Preferred metals and alloys include aluminum, lithium-aluminum alloys, lead, tin, tin/lead alloys and other metal and alloys which can alloy with alkali metals. Other useful and preferred electroactive materials which can be used in the manufacture of anodes are the transition metal chalcogenides. Such chalcogenides for use in the practice of this invention can vary widely and include $WO_2$, $MoO_2$, $Li_xTiS_2$, $Li_xVSe_2$, and $Li_xVS_2$ where $1 < x < 2$.

In these preferred embodiments of the invention, the powdered metal, alloy or other electroactive material generally has an average particle diameter of from about 100 μm to about 0.05 μm. In the preferred embodiments of the invention, average particle diameter is from about 20 μm to about 0.1 μm, and in the particularly preferred embodiments is from about 0.1 μm to about 10 μm. Amongst these particularly preferred embodiments most preferred are those embodiments in which average particle diameter is from about 0.1 μm to about 5 μm.

In the polymerization step of the process of this the invention, the substrate having a catalytic surface and in a suitable form, as for example, in the form of a finely divided particulate material or large solid substrate is contacted with a gas, suspension or solution of the monomer, monomers or other precursors of the desired conjugated backbone polymer, or other polymer which can be converted into a conjugated backbone polymer after polymerization, if necessary in the presence of a co-catalyst, such as triethylaluminum, tetramethyl tin, tetraphenyl tin and the like. Thereafter the monomer, monomers or precursors are polymerized, forming the polymer on the surface of the substrate anchored thereto through the bonded catalyst.

The polymer-coated substrate may be combined with additional conjugated backbone polymers or polymers which can be converted to a conjugated backbone polymer by blending the polymer-coated substrate with the preformed polymer or by the further polymerization of monomers of the additional polymer by unmodified catalyst in the presence of the polymer-coated substrate. This combination yields a desired ratio of substrate to polymer, and is useful is the fabrication of articles having a continuous conjugated backbone polymer phase containing dispersed substrate. In the preferred embodiments of this invention, the polymerization of monomers or precursors is performed in a mixture of substrates having a catalytic surface and unmodified polymerization catalyst. This combination of steps (b) and (c) yields a composite with good adhesion between substrate and the additional polymer via the polymer coating, as well as the desired weight ratio of substrate to polymer.

The types of monomers or precursors employed will vary widely depending on the desired conjugated backbone polymer. Useful monomer are those which are precursors in the production of conjugated backbone polymers known to those of skill in the art or monomers which form other types of polymers which can be converted into the desired conjugated backbone polymer. Illustrative of monomers used in the formation of polymers which are convertible into conjugated backbone polymers is 7,8-bis(trifluorometyl)tricyclo[4,2,20]deca-3,7,9-triene whose metathesis polymerization product can be converted to polyacetylene, and monomers which can be polymerized to form poly(5,6-diacetoxycyclohex-2-ene-1,4-diyl) which can be converted to poly(paraphenylene). Mixtures of monomers can be used. For example, various combinations of monomers can be employed to form conjugated backbone copolymers, or blends of one or more conjugated backbone homopolymers or copolymers with one or more conjugated backbone or non-conjugated backbone homopolymers or copolymers. As is apparent from the foregoing, monomers useful in the practice of this invention can vary widely and may include monomers which can be polymerized into unsubstituted and substituted polyacetylene, poly paraphenylene), poly(phenylquinoline), poly(phenylene vinylene) and the like. Other useful monomers include those which can be polymerized into conjugated backbone polymers claimed by others as useful in batteries such as monomers which form polythiophene, polyazulene, poly(phenylquinoline), polypyrrole, polyacenes, polyaniline, polyacenediyls, polynaphthalene, substituted derivatives, polymeric blends thereof and the like.

Preferred for use in the practice of this invention are monomers which can be directly polymerized to form conjugated backbone polymers useful as battery electrodes, or to form other polymers which can be converted into these conjugated backbone polmers. Conjugated backbone polymers useful as negative electrodes are conductive in their reduced form, and capable of reversibly inserting cations. Conjugated backbone polymers useful as positive electrodes are conductive in their oxidized or reduced form, and are capable of reversibly inserting anions or cations. Amongst these illustrative conjugated backbone polymers, polyacetylene, poly(phenylene vinylene) and poly(p-phenylene) are preferred for use in negative electrodes, and polyacetylene and poly(p-phenylene) are particularly preferred for such use. Polyacetylene, polypyrrole, polyaniline, polythiophene and substituted derivatives thereof are preferred for use in positive electrodes and polyaniline and polypyrrole are particularly preferred for this use. Accordingly, monomers and other precursors which result in the formation of these polymers are preferred and particularly preferred for use in the practice of this invention, respectively. Most preferred for use in the practice of this invention is polyacetylene and accordingly, acetylene is the most preferred monomer.

Polymerization reaction conditions for the polymers and precursor polymers described above as well known in the art. For example, useful conditions are described in detail in H. Shirakawa, et al., *Polym. J.*, 2, 231 (1971); J.C.W. Chien, et al., *Macromolecules*, 14, 497, (1981), (W.J. Feast et al., European Pat. publication No. 0080 329), Kovacic, *J. Am. Chem. Soc.* 85:454-458 (1963), and U.S. Pat. No. 3,404,132. The monomer or other precursors undergo coordination polymerization to yield a conjugated backbone polymer or a polymer which can be converted into a conjugated backbone polymer which adheres to the surface of the substrate. Insoluble polymers form particles and/or gels or films nucleated about the substrate having a catalytic surface, as for example particles of derivatized metal, alloy or other electroactive material, and are attached to the surface of the substrates. Soluble polymers form mixtures of a solution of the polymer and the insoluble polymer-coated substrate which may be suspended in the solution if it is finely divided. If the polymer in solution is the same as or is compatible with the polymers bound onto the surface of the substrate, the articles which are cast from the solution suspenion will contain polymer tightly bound to the substrate via the polymer coating.

The composite of polymer and substrate can be recovered from the polymerization mixture using standard procedures. Composites of soluble polymers nucleated about substrates can be filtered to recover the insoluble derivatized fraction. Composites which are powders, gels, or films of insoluble polymers nucleated about derivatized substrates can be extracted with a solvent which is unreactive with the polymer and the substrate. For example, in those embodiments of this invention in which the product is a continuous film of polymer having finely divided electroactive material therein or coated onto a grid of some material, such as nickel, steel, stainless steel, graphite, and the like, the film composite, is removed from the polymerization mixture, extracted with an inert solvent, and thereafter used in battery construction as an electrode in accordance with conventional procedures. Illustrative of such procedures are those described in Kaner and MacDiarmid, *J. Chem. Soc. Faraday Trans*, 1, 80, 2109 (1984) and Nagatomo et al., *J. Electrochem. Soc.*, 132, 1380 (1985), which are hereby incorporated by reference.

In the preferred embodiments of this invention in which the substrate is a finely divided metal, alloy or other electroactive material, the coated substrate is fabricated into a cohesive solid such as for use in the construction of an electrode of a battery. Useful fabrication procedures include compressing or rolling powdered or gel composites into a film or other solid object or removing the solvent component of a suspended polymer composite to form a film. Such fabrication techniques as are applied to the construction of battery electrodes are known to those of skill in the art, as for example, those described in U.S. Pat. No. 4,496,640 and European Patent Application EP 0 076 119 A2, all of which are incorporated herein by reference.

The following specific examples are presented to more particularly illustrate the invention and are not to be construed as limitations thereon.

EXAMPLE I

A. An aluminum-polyacetylene composite film was formed by the polymerization of acetylene gas in a vigorously stirred slurry of aluminum powder derivatized by TiCl$_4$ in 6 $\mu$ Ti(O-nBu)$_4$/AlEt$_3$ (1:7) in toluene at $-78°$ C., using a modification of the procedure described in by J. Hocker (Bayer) U.S. Pat. No. 4,408,207. Aluminum spheres ca. 20 $\mu$m in diameter were heated to 465° C. in vacuo for 16 hours, stirred in 10% TiCl$_4$ in cyclohexane at 18° C. for 16 hours, washed three times in fresh cyclohexane and vacuum dried. When combined with alkyl aluminum compounds, TiCl$_4$ has been shown to be a polymerization catalyst. See Kambara, Katano & Hosoe, *J. Chem. Soc. Japan, Inc. Chem.*, 65, 720 (1962). The TiCl$_4$ reacted with the oxide layer of the aluminum spheres to produce tetravalent titanium chloride bonded to the aluminum surface via aluminum-oxygen-titanium bonds. A 500 mL 3-necked reactor equipped with a mechanical stirrer was charged with 2g of derivatized Al powder, 50 mL toluene, 0.34 mL AlEt$_3$, and 0.1 mL Ti(O-nBu)$_4$ under a constant flow of dry nitrogen. The reactor was cooled to −78° C. and vigorous stirring was established before acetylene gas was added to the N$_2$ flow to make a 1:1 mixture of gases. Polymer particles, which were in part nucleated about the derivatized Al powder, were formed immediately. After 10 min., the stirring caused these particles to aggregate on the reactor wall forming a smooth film. Scanning electron micrographs indicate a uniform distribution of aluminum particles through the film thickness as well as intimate contact between Al metal and polymers fibrils.

B. A 1.5-cm$^2$ film weighing 30 mg and having a gross composition of (CHAl$_{1.5}$)$_x$ prepared as in Step A was electrochemically reduced and reoxidized in an electrolyte of 1M LiBBu$_4$/THF versus a lithium metal counter electrode. During the constant current cycle at 0.33 mA/cm$^2$, the composition of the electrode varied from CHAl$_{1.5}$ to Li$_{0.6}$CHAl$_{1.5}$ and back to Li$_{0.07}$CHAl$_{1.5}$ corresponding to a utilization of about 6 mAh/cm$^2$ or 380 mAh/g. The initial stage of reduction to Li$_{0.12}$CHAl$_{1.5}$, exhibited a sloping voltage vs. charge associated with the n-doping of polyacetylene to 12 mole percent or Li$_{0.12}$CH. The remainder of the reduction process took place at a nearly constant voltage of .28V and is attributed to the alloying of Li with Al to yield a Li distribution of Li$_{0.12}$CH(Li$_{0.32}$Al)$_{1.5}$. The reoxidation proceeded at ca. 0.48V until the composition was again Li$_{0.12}$CHAl$_{1.5}$ at which point the voltage began to increase as lithium was removed from the polyacetylene. A second reduction was allowed to proceed until a lower voltage limit of 0.2V was reached, at which point, the electrode composition was consistent with 100% Li alloying of the aluminum and 14% doping of the polyacetylene or Li$_{0.14}$CH (Li$_{1.0}$Al)$_{1.5}$, a utilization equivalent to about 675 mAH/g.

EXAMPLE II

A. An aluminum-polyacetylene composite was formed by the polymerization of acetylene gas in a stirred slurry of powdered LiAl alloy in a dilute solution of Ti(O-nBu)$_4$/AlEt$_3$ (1:4) in toluene at −78° C. Metallurgically prepared Li$_{1.0}$Al alloy was pulverized in a ball mill for 16 hours. A 150 mL reactor was charged with 1 g of the powdered alloy, 50 mL of toluene, 0.17 mL of AlEt$_3$ and finally 0.10 mL of Ti(O-nBu)$_4$ causing the powder to darken. After chilling to −78° C. and degassing the mixture, ca. 0.5 atm. of acetylene was introduced. Since the stirring was slow and insufficient to cause powder formation, a polymer film formed at the top of the catalyst pool and incorporated some of the powdered alloy. After 14 hours, the film was washed in THF and dried. The resulting copper-colored film had a room temperature conductivity of 80 Scm$^{-1}$ and an open circuit voltage vs. Li of 0.76 V, consistent with polyacetylene n-doped to ca. 7% with Li$^+$ as the counterion.

B. A 1.0-cm$^2$ film weighing 16.5 mg and having an initial composition of Li$_{0.07}$CHAl$_{0.07}$ prepared as in Step A. Step A was electrochemically reduced and reoxidized in an electrolyte of 1M LiBBu$_4$/THF versus a Li metal counter electrode. After first stripping away the original Li content, the first cycle at 0.5 mA/Cm$^2$ between voltage limits of 2.5 and 0.2V, resulted in a composition change from CHAl$_{0.07}$ to Li$_{0.19}$CHAL$_{0.07}$ and back to CHAl$_{0.07}$. The initial stage of reduction to Li$_{0.12}$CHAl$_{0.07}$ exhibited the sloping voltage vs. charge associated with n-doping polyacetylene to 12% or Li$_{0.12}$CH. The remainder of the reduction process took place at a nearly constant voltage of 0.3V attributed to the alloying of Li with Al to yield a Li distribution of Li$_{0.12}$CH(LiAl)$_{0.07}$. The reoxidation proceeded to 0.45V until the composition was again Li$_{0.12}$CHAl$_{0.07}$ at which point, the lithium content of the alloy was exhausted and the polyacetylene began to undope. An additional 29 cycles between 0.2 and 1.5V exhibited the same voltage characteristics and 100% coulombic efficiency throughout. The utilization ranged from 4.4 mAh/cm$^2$ on the fifth cycle to 4.1 mAh/cm$^2$ on the fifteenth cycle to 3.8 mAh/cm$^2$ on the thirtieth cycle. The amount of Li cycled on the last cycle between the voltage limits of 0.2 and 1.5V was 83% of that observed on the first cycle within the same voltage range.

EXAMPLE III

A. An aluminum-polyacetylene composite was prepared by the polymerization of acetylene in a rapidly spinning cylindrical reactor (100 mm I.D.×120 mm) containing 20g Al powder derivatized by TiCl$_4$ (50-1000 μm), 35 mL of toluene, 3.5 mL triethyl aluminum, 2.0 mL of titanium tetrabutoxide, and a derivatized cylinder of expanded nickel screen (314 mm×120 mm) previously derivatized by reaction with TiCl$_4$ fitted closely to the inside wall of the reactor. After chilling to −79° C. and degassing the catalyst mixture, the reactor was rotated about its axis such that the aluminum/catalyst slurry was uniformly distributed on the reactor wall completely immersing the nickel screen. Both the Al powder and the nickel screen had been dried in vacuo at 450° C. and reacted with TiCl$_4$ as in Example I. A pressure of 500 torr (66.5 kPa) of C$_2$H$_2$ was maintained for 3 hours which allowed the polymer to form throughout the volume of the catalyst-Al slurry, thereby encasing both the Al powder and the nickel screen. After repeated THF washes, two 3.5 cm$^2$ samples each weighing ca. 0.22g (0.025g (CH)$_x$, 0.055g Ni, 0.140g Al) were reduced by reaction with a 0.1M solution of sodium naphthalide in THF, washed again in THF, and exposed to 400 torr (53.2 kPa) of ethylene oxide for ½ hour to produce poly(ethylene oxide) at the polyacetylene surfaces (U.S. Pat. No. 4,472,487). Following a final THF wash to remove unbonded poly(ethylene oxide), the samples were employed as anodes in the battery cell described in Section B, below.

B. A battery cell having an anode comprised of aluminum powder-polyacetylene (CHAl$_n$)$_x$ composite prepared as in Step A which had been surface modified with polyethylene oxide, lithium cobalt dioxide cathode, and an electrolyte of lithium perchlorate in propylene carbonate was charged and deeply discharged 36 times at 2.8 mA/cm$^2$ in the voltage range of 3.0V to 4.1V prior to cycling the cell, consisting of two 3.5 cm$^2$ plates of (CHAl$_n$)$_x$ and three plates of LiCoO$_2$ and having a volume of 1.6 cm$^3$, delivered 36 mA at 3.6V and 120 ma at 2.8V. The amount of charge released per cycle could be held at ca. 50 mAh but not without gradually increasing the upper voltage limit from 3.9 to 4.1V. The onset of the 20mA discharge was at ca. 3.85V and sloped gradually to 3.5V before turning down to the cut-off voltage; the average value of the discharge voltage was ca. 3.7V. The coulomb efficiency remained between 98 and 100% throughout the 36 cycles. The composition of the composite ranged from an initial valued of (CHAl$_2$)$_x$ to ca. Li$_{0.14}$CH(Li$_{0.15}$Al)$_2$, when the cell was charged, and back to ca. Li$_{0.07}$CHAl$_2$ with each cycle. Raising the upper voltage limit was necessary to access more of the Li stored in the $LiCoO_2$ cathodes because it was not being restored fully from the composite anodes during recharge. This was presumably due to shedding of the large (45-2000 Mm) Al particles occurring during the alloying process and the consequent isolation of some of the Li-loaded fragments.

EXAMPLE IV

In a three neck round bottom flask, 0.356g of aluminum powder and 6.0g of molybdenum (VI) tetrachloride oxide were combined under argon. Using a syringe, 10g of benzene were added and the mixture was stirred under argon for 120 hours at room temperature.

The resulting poly(p-phenylene) Al composite was washed repeatedly with benzene, acetonitrile, water, and acetone and dried under vacuum. Infrared spectra showed absorption bands characteristic of poly(p-phenylene).

An electrode was fashioned by pressing a mixture of 77% poly(p-phenylene) Al composite, 13% carbon black, and 10% binder onto a nickel grid at 1000hg/cm$^2$ in a rectangular press. The electrode was then removed and heat set at 160° C.

After low molecular weight oligomers were extracted, this electrode was incorporated into a half cell consisting of a lithium reference and counter electrode and 0.5M LiBBu$_4$ in THF as the electrolyte. The cell was cycled between 1.1V and 0.1V with respect to the lithium reference. The capacity was 575C per gram of composite of which 345C were due to Li insertion into the alumunim and 230C were due to Li insertion into the poly(p-phenylene). The average coulombic efficiency over twelve cycles was 98% and there was no loss in capacity with cycling.

What is claimed is:

1. A process for fabricating a composite comprising a substrate having a conjugated backbone polymer or polymer adhering to the surface thereof, said process comprising contacting a gas, suspension or solution of a monomer, monomers or other precursor of said polymer with a substrate having a catalyst for the polymerization of said monomer, monomers or other precursors bonded to the surface thereof or as a part of said surface thereby forming a layer of said polymer on the surface of said substrate bonded to said catalyst bonded to or a part of the surface of said substrate wherein said substrate has a catalyst bonded to the surface thereof formed by derivatizing the surface of said substrate with an active polymerization catalyst prior to contacting said substrate with said monomer, monomers or precursors.

2. A process according to claim 1 wherein said substrate has a surface which is reactive with said polymerization catalyst.

3. A process according to claim 2 wherein said substrate surface is made reactive with said polymerization catalyst by chemical, thermal, electrochemical or photochemical treatment of said substrate surface, which process further comprises subjecting said substrate to said treatment prior to contacting said monomer, monomers or other precursors and said substrate.

4. A process according to claim 3 wherein said substrate is pretreated with agents capable of forming functionalities selected from the group consisting of oxide, carboxylic acid, sulfide, on the surface of said substrate.

5. A process according to claim 1 wherein said substrate is a sheet or grid composed of a metal and said monomer or precursor is polymerized onto the surfaces of said sheet or grid.

6. A process according to claim 5 wherein said metal is selected from the group consisting of nickel, steel and stainless steel.

7. A process according to claim 6 wherein said metal is nickel or stainless steel.

8. A process of fabricating a battery electrode which comprises an intimate mixture of a finely divided electroactive material in a matrix composed of a conjugated backbone polymer, said method comprising the steps of:
(a) derivatizing the surface of a finely divided material selected from the group consisting of alkali metal alloying metals and alkali metal cation inserting materials with a catalyst for conjugated backbone polymers or a catalyst for polymers which can be converted into a conjugated backbone polymer;
(b) dispersing said derivatized metal or material in a gas, suspension or solution of one or more monomers or other precursors for said polymer and polymerizing said monomers or other precursor in the presence of said finely divided metal or material having to form finely divided metal or material polymer coated on the surface thereof;
(c) polymerizing additional monomer, monomers or other precursors in the presence of polymer coated metal or material to provide a predetermined polymer to metal or material weight ratio; and
(d) recovering said polymer coated metal or material or a combination of polymer and polymer coated metal or material from said solution or suspension and fabricating same into a cohesive solid.

9. A process according to claim 8 wherein said monomers or precursor can be directly polymerized into a conjugated backbone polymer.

10. A process according to claim 8 wherein said electrode is a positive electrode, and wherein said polymer is conductive in its oxidized form and capable of being doped by anions.

11. A method according to claim 10 wherein said monomers or other precursors are selected from the group consisting of those which can be polymerized into polyacetylene, polypyrrole, polyaniline and polythiophene or substituted derivatives thereof.

12. A process according to claim 11 wherein said polymer is selected from the group consisting of polypyrrole and polyaniline.

13. A process according to claim 7 wherein said finely divided substrate is selected form the group consisting of transition metal chalcogenides.

14. A process according to claim 13 wherein said transition metal chalcogenide is selected from the group consisting of $TiS_2$, $MoS_2$, $V_6O_{13}$, $MnO_2$, $Li_xCoO_2$, $Na_xCoO_2$, and $Cr_{1-x}V_xS_2$ where $1 \leq x \leq 2$.

15. A process according to claim 14 wherein said transition metal chalcogenide is selected from the group consisting of $Na_xCoO_2$, $Li_xCoO_2$, $MnO_2$, and $V_6O_{13}$ where $1 \leq x \leq 2$.

16. A process according to claim 7 wherein said process is used to form a negative electrode wherein said polymer is conductive in its reduced state and capable of reversibly inserting cations.

17. A method according to claim 16 wherein said monomers or other precursors are selected from the groups consisting of those which can be polymerized into polyacetylene, poly(p-phenylene) and poly(phenylene vinylene).

18. A method according to claim 17 wherein said monomers or other precusors are selected from the group consisting of those which can be polymerized into poly(p-phenylene) and polyacetylene.

19. A method according to claim 16 wherein said finely divided substrate is selected from the group consisting of alkali metal alloying metals and alkali metal inserting materials.

20. A method according to claim 19 wherein said substrate is selected from the group consisting of alkali metal alloying metals.

21. A metal according to claim 20 wherein said substrate is selected from the group consisting of aluminum, lead, tin and tin/lead alloy.

22. A method according to claim 21 wherein said substrate is aluminum.

* * * * *

UNITED STATES PATENT AND TRADEMARK OFFICE
CERTIFICATE OF CORRECTION

PATENT NO. : 4,915,985
DATED : April 10, 1990
INVENTOR(S) : Maxfield et al.

It is certified that error appears in the above–identified patent and that said Letters Patent is hereby corrected as shown below:

Col. 10, line 57, "$1 \leqq x \leqq 2$" should read --$1 \leq x \leq 2$--.

Col. 10, line 61, "$1 \leqq x \leqq 2$" should read --$1 \leq x \leq 2$--.

Signed and Sealed this

Eighteenth Day of February, 1992

Attest:

HARRY F. MANBECK, JR.

*Attesting Officer*      *Commissioner of Patents and Trademarks*